(12) United States Patent
Li et al.

(10) Patent No.: US 12,315,880 B2
(45) Date of Patent: May 27, 2025

(54) ELECTROLYTE FOR LITHIUM-ION BATTERY, LITHIUM-ION BATTERY, BATTERY MODULE, BATTERY PACK, AND APPARATUS

(71) Applicant: CONTEMPORARY AMPEREX TECHNOLOGY (HONG KONG) LIMITED, Hong Kong (CN)

(72) Inventors: Yongkun Li, Ningde (CN); Kai Wu, Ningde (CN); Bo Cheng, Ningde (CN); Feng Ju, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 537 days.

(21) Appl. No.: 17/702,645

(22) Filed: Mar. 23, 2022

(65) Prior Publication Data
US 2022/0216517 A1 Jul. 7, 2022

Related U.S. Application Data

(63) Continuation of application No. PCT/CN2020/120307, filed on Oct. 12, 2020.

(30) Foreign Application Priority Data

Oct. 18, 2019 (CN) .......................... 201910994359.8

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
None
See application file for complete search history.

(56) References Cited

U.S. PATENT DOCUMENTS

| 2008/0020286 A1 | 1/2008 | Haruna et al. | |
| 2013/0059210 A1* | 3/2013 | Yu ........................... | H01M 4/13 |
| | | | 429/207 |

(Continued)

FOREIGN PATENT DOCUMENTS

| CN | 103518284 A | 1/2014 |
| CN | 104332653 A | 2/2015 |

(Continued)

OTHER PUBLICATIONS

International Search Report and Written Opinion, PCT/CN2020/120307, Jan. 4, 2021, 12 pgs.

(Continued)

*Primary Examiner* — Alix E Eggerding
(74) *Attorney, Agent, or Firm* — K&L Gates LLP

(57) ABSTRACT

This application provides an electrolyte for lithium-ion battery, a lithium-ion battery, a battery module, a battery pack, and an apparatus. The electrolyte includes an organic solvent, an electrolytic lithium salt dissolved in the organic solvent, and additives, where the additives include a first additive and a second additive. The first additive includes an alkenyl dioxaborolane compound represented by formula I or formula II, and the second additive includes phosphoric acid cyclic anhydride represented by formula III. After the electrolyte of this application is applied to a lithium-ion (Continued)

battery, the lithium-ion battery can, at high voltage, have a good high-temperature cycling performance and high-temperature storage performance, a low direct current resistance, as well as good high-voltage characteristics.

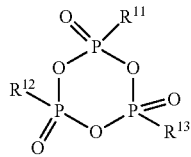

Formula III

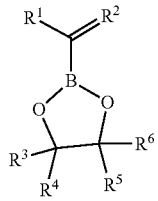

Formula I

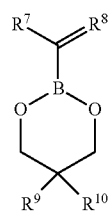

Formula II

19 Claims, 3 Drawing Sheets

(56) References Cited

U.S. PATENT DOCUMENTS

2020/0373623 A1\* 11/2020 Kinoshita ......... H01M 10/0568
2020/0388885 A1\* 12/2020 Ji ........................ H01M 4/808

FOREIGN PATENT DOCUMENTS

| CN | 106340670 A | 1/2017 |
| CN | 108417894 A | 8/2018 |
| CN | 109755648 A | 5/2019 |
| CN | 110010955 A | 7/2019 |
| CN | 110783626 A | 2/2020 |
| JP | 2008130528 A | 6/2008 |
| KR | 20090056740 A | 6/2009 |

OTHER PUBLICATIONS

Ningde Age New Energy Technology Co. Ltd., Office Action, CN201910994359.8, Aug. 19, 2020, 9 pgs.

\* cited by examiner

ELECTROLYTE FOR LITHIUM-ION BATTERY, LITHIUM-ION BATTERY, BATTERY MODULE, BATTERY PACK, AND APPARATUS

CROSS-REFERENCE TO RELATED APPLICATIONS

This application is a continuation application of PCT Patent Application No. PCT/CN2020/120307, entitled "ELECTROLYTE FOR LITHIUM ION BATTERY, LITHIUM ION BATTERY, BATTERY MODULE, BATTERY PACK AND DEVICE" filed on Oct. 12, 2020, which claims priority to Chinese Patent Application No. 201910994359.8, filed with the State Intellectual Property Office of the People's Republic of China on Oct. 18, 2019, and entitled "ELECTROLYTE FOR LITHIUM-ION BATTERY, LITHIUM-ION BATTERY, BATTERY MODULE, BATTERY PACK, AND APPARATUS", all of which are incorporated herein by reference in their entirety.

TECHNICAL FIELD

This application relates to the field of batteries, and in particular, to an electrolyte for lithium-ion battery, a lithium-ion battery, a battery module, a battery pack, and an apparatus.

BACKGROUND

Compared with lead-acid batteries, nickel-metal hydride batteries, and nickel-cadmium batteries, lithium batteries have advantages such as high specific energy density, wide operating temperature range, and long cycle life, making them the mainstream of the market for a long time. With the expansion of market demand for electronic products and the development of power and energy storage equipment, people's expectations for improving energy density of lithium-ion batteries are increasingly high. Therefore, it is imperative to develop lithium-ion batteries with high energy density.

It is known that high-voltage lithium-ion batteries are one effective method to increase the energy density of lithium-ion batteries. Therefore, lithium-ion batteries with an operating voltage above 4.4V have become a hot topic of research by many research institutions and enterprises. However, at high voltage, oxidation activity of a positive electrode becomes higher, and a non-aqueous electrolyte is prone to electrochemical oxidation reaction on a surface of the positive electrode plate, which in turn causes generation of gas. In addition, at high voltage, transition metal ions in a positive electrode material dissolve and migrate to a negative electrode to consume active lithium ions, leading to deteriorated electrochemical performance of lithium ions and in turn failure.

The solution is to add film-forming additives to the electrolyte, so as to improve interface stability between the electrolyte and the positive electrode by employing the film-forming function of the additives on an interface. These additives can form a film on the positive electrode, but they may increase interface impedance, resulting in a poorer kinetic performance in migration and diffusion of lithium ions in the battery, thereby deteriorating storage performance and cycling performance of the lithium-ion battery.

SUMMARY

Some embodiments of this application provide an electrolyte for lithium-ion battery, a lithium-ion battery, a battery module, a battery pack, and an apparatus. According to this application, the lithium-ion battery can have better cycling performance and storage performance at high voltage, and rate charging performance of the lithium-ion battery is also improved, effectively resolving the defects in the prior art.

According to a first aspect, this application provides an electrolyte for lithium-ion battery, including an organic solvent, an electrolytic lithium salt dissolved in the organic solvent, and additives, where the additives include a first additive and a second additive.

The first additive includes an alkenyl dioxaborolane compound represented by formula I or formula II:

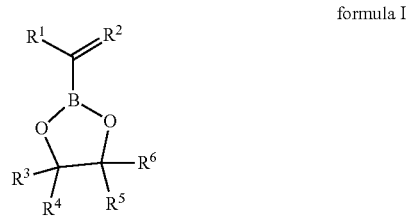

formula I

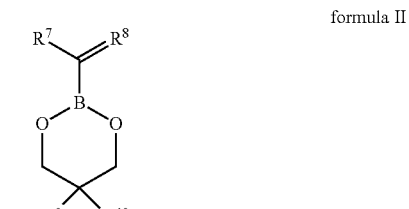

formula II

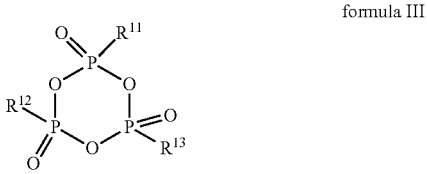

formula III where $R^1$, $R^2$, $R^3$, $R^4$, $R^5$, $R^6$, $R^7$, $R^8$, $R^9$, and $R^{10}$ are each independently selected from H and a saturated alkyl group containing 1 to 10 carbon atoms, or $R^1$ and $R^2$ or $R^7$ and $R^8$ jointly form a 3- to 6-membered heterocyclic structure having at least one double bond and containing at least one heteroatom selected from O, S, and N.

The second additive includes phosphoric acid cyclic anhydride represented by formula III, where $R^{11}$, $R^{12}$, and $R^{13}$ are each independently selected from H, a saturated or unsaturated alkyl group containing 1 to 20 carbon atoms, or a group containing 6 to 18 carbon atoms and at least one benzene ring.

According to a second aspect, this application provides a lithium-ion battery, including a positive electrode, a negative electrode, a separator, and the electrolyte according to the first aspect of this application.

According to a third aspect, this application further provides a battery module, including the lithium-ion battery according to the second aspect of this application.

According to a fourth aspect, this application further provides a battery pack, including the battery module according to the third aspect of this application.

According to a fifth aspect, this application further provides an apparatus, including the lithium-ion battery according to the second aspect of this application, where the lithium-ion battery is used as a power source of the apparatus.

After the electrolyte of this application is applied to a lithium-ion battery, the lithium-ion battery can, at high voltage, have a good high-temperature cycling performance and high-temperature storage performance, a low direct current resistance, as well as good high-voltage characteristics. The battery module, the battery pack, and the apparatus that include the lithium-ion battery of this application have at least the same advantages as the lithium-ion battery.

Figure 1:
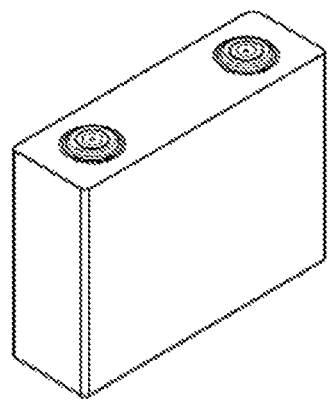
FIG. 1 is a perspective view of a lithium-ion battery according to an embodiment of this application.

Reference signs are as follows:
1. battery pack;
2. upper box body;
3. lower box body;
4. battery module;
5. battery cell;
   51. housing;
   52. electrode assembly; and
   53. top cover assembly.

DESCRIPTION OF EMBODIMENTS

The following describes in detail an electrolyte, a lithium-ion battery containing the electrolyte, a battery module, a battery pack, and an apparatus according to this application.

For simplicity, only some numerical ranges are exemplarily disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded. It should be understood that the enumeration of numerical values is merely an example and should not be interpreted as exhaustive.

In the descriptions of this specification, it should be noted that, unless otherwise stated, "more than", "less than", "<", and ">" are all inclusive of the present number, "at least one" means including one or more, and "more" in "one or more" means two or more than two.

Electrolyte

The following describes in detail an electrolyte for lithium-ion battery according to a first aspect of this application.

The electrolyte for lithium-ion battery according to the first aspect of this application includes an organic solvent, an electrolytic lithium salt dissolved in the organic solvent, and additives, where the additives include a first additive and a second additive.

The first additive includes an alkenyl dioxaborolane compound represented by formula I or formula II:

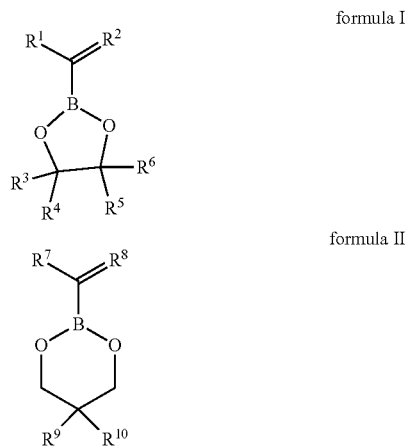

where $R^1$, $R^2$, $R^3$, $R^4$, $R^5$, $R^6$, $R^7$, $R^8$, $R^9$, and $R^{10}$ are each independently selected from H and a saturated or unsaturated alkyl group containing 1 to 10 carbon atoms, or $R^1$ and $R^2$ or $R^7$ and $R^8$ jointly form a 3- to 6-membered heterocyclic structure having at least one double bond and containing at least one heteroatom selected from O, S, and N.

In an embodiment of this application, $R^1$, $R^2$, $R^3$, $R^4$, $R^5$, $R^6$, $R^7$, $R^8$, $R^9$, and $R^{10}$ are each independently selected from H.

In an embodiment of this application, $R^1$, $R^2$, $R^3$, $R^4$, $R^5$, $R^6$, $R^7$, $R^8$, $R^9$, and $R^{10}$ are each independently selected from a saturated alkyl group containing 1 to 5 carbon atoms, for example, including but not limited to a methyl group, a methylene group, an ethyl group, n-propyl, isopropyl, n-butyl, isobutyl, sec-butyl, tert-butyl, n-pentyl, 1-methylbutyl, 2-methylbutyl, 3-methylbutyl, 2-ethylpropy, 1,1-dimethylpropyl, 1,3-dimethylpropyl, 2,2-dimethylpropyl, or the like.

In an embodiment of this application, $R^1$, $R^2$, $R^3$, $R^4$, $R^5$, $R^6$, $R^7$, $R^8$, $R^9$, and $R^{10}$ are each independently selected from an unsaturated alkyl group containing 2 to 5 carbon atoms, for example, including but not limited to vinyl or propenyl.

In an embodiment of this application, $R^1$, $R^2$, $R^3$, $R^4$, $R^5$, $R^6$, $R^7$, $R^8$, $R^9$, and $R^{10}$ are each independently selected from a methyl group, a methylene group, or an ethyl group.

In an embodiment of this application, $R^1$, and $R^2$ or $R^7$ and $R^8$ jointly form a 3- to 6-membered heterocyclic structure having at least one double bond and containing at least one heteroatom selected from O, S, and N, for example, including but not limited to the following heterocyclic structures:

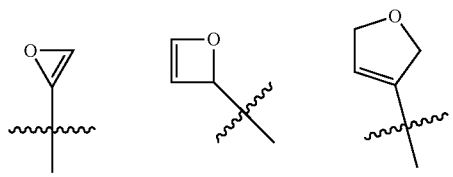

-continued

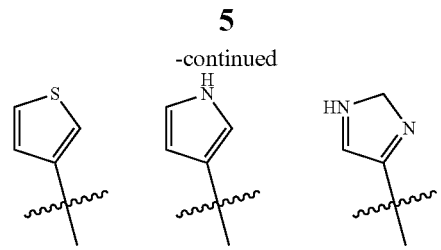

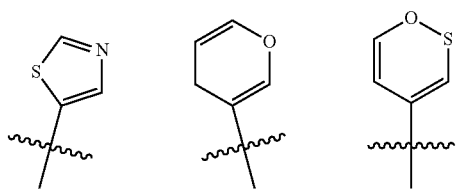

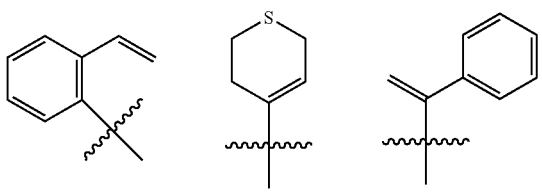

In an embodiment of this application, R¹ and R² or R⁷ and R⁸ form a heterocyclic structure shown below:

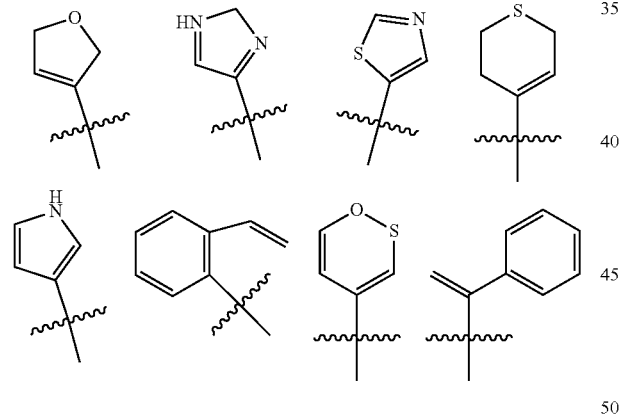

In an embodiment of this application, the first additive is selected from at least one of the following compounds:
2-isopropenyl-4,4,5,5-tetramethyl-1,3,2-dioxaborolane (compound 1-1),
5,5-dimethyl-2-(isopropen-1-yl)-1,3,2-dioxaborolan (compound 1-2),
2-(2,5-dihydrofuran-3-yl)-4,4,5,5-tetramethyl-1,3,2-dioxaborolane (compound 1-3),
trans-2-butene-2-boronic acid pinacol ester (compound 1-4),
2-(3,6-dihydro-2H-thiopyran-4-yl)-4,4,5,5-tetramethyl-1,3,2-dioxaborolane (compound 1-5), or
2-(1-styryl)-4,4,5,5-tetramethyl-(1,3,2)dioxaborolane (compound 1-6).

compound 1-1
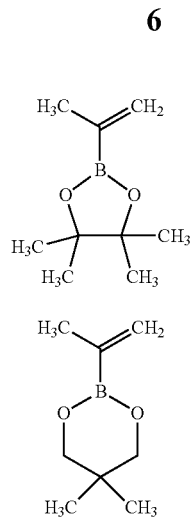

compound 1-2
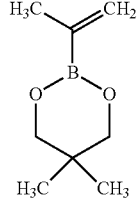

compound 1-3
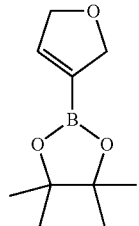

compound 1-4
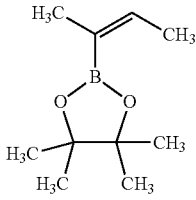

compound 1-5
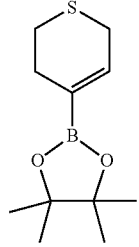

compound 1-6
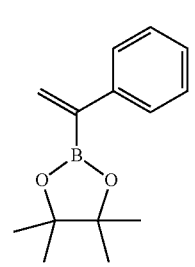

In an embodiment of this application, the first additive is an alkenyl dioxaborolane compound represented by formula I, where R¹, R², R³, R⁴ and are each independently selected from H and a saturated alkyl group containing 1 to 5 carbon atoms, or R¹ and R² jointly form a 3- to 6-membered heterocyclic structure having at least one double bond and containing at least one heteroatom selected from O, S, and N.

In an embodiment of this application, the alkenyl dioxaborolane compound represented by formula I is selected from at least one of the following compounds:

2-isopropenyl-4,4,5,5-tetramethyl-1,3,2-dioxaborolane (compound 1-1), 5,5-dimethyl-2-(isopropen-1-yl)-1,3,2-dioxaborolan (compound 1-2), or trans-2-butene-2-boronic acid pinacol ester (compound 1-4).

The first additive can form a film on an interface between positive and negative electrodes, and an interface film (generally called SEI film) formed by the first additive on the positive electrode can effectively inhibit the electrolyte from being oxidized and decomposed on a surface of the positive electrode plate. This can prevent products from oxidative decomposition of the electrolyte from being deposited on the interface of the positive electrode plate to increase interface impedance of the positive electrode, and can also prevent the electrolyte from being oxidized and decomposed on the interface of the positive electrode plate to generate gas and deteriorate electrical contact of the interface.

The second additive includes phosphoric acid cyclic anhydride represented by formula III, where $R^{11}$, $R^{12}$, and $R^{13}$ are each independently selected from H, a saturated or unsaturated alkyl group containing 1 to 20 carbon atoms, or a group containing 6 to 18 carbon atoms and at least one benzene ring.

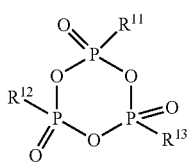

formula III

In an embodiment of this application, $R^{11}$, $R^{12}$, and $R^{13}$ are each independently selected from H.

In an embodiment of this application, $R^{11}$, $R^{12}$, and $R^{13}$ are each independently selected from a saturated alkyl group containing 1 to 5 carbon atoms, for example, including but not limited to a methyl group, a methylene group, an ethyl group, n-propyl, isopropyl, n-butyl, isobutyl, sec-butyl, tert-butyl, n-pentyl, 1-methylbutyl, 2-methylbutyl, 3-methylbutyl, 2-ethylpropy, 1,1-dimethylpropyl, 1,3-dimethylpropyl, 2,2-dimethylpropyl, or the like.

In an embodiment of this application, $R^{11}$, $R^{12}$, and $R^{13}$ are each independently selected from an unsaturated alkyl group containing 1 to 5 carbon atoms, for example, including but not limited to vinyl, propenyl, cyclopropenyl, 1-butenyl, cis-2-butenyl, trans-2-butenyl, 1-pentenyl, and 3-pentenyl.

In an embodiment of this application, the second additive is selected from at least one of the following compounds: trimethyl phosphoric acid cyclic anhydride (compound 2-1), triethyl phosphoric acid cyclic anhydride (compound 2-2), tripropyl phosphoric acid cyclic anhydride (compound 2-3), or triphenyl phosphoric acid cyclic anhydride (compound 2-4):

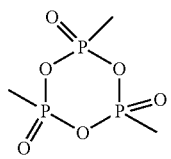

compound 2-1

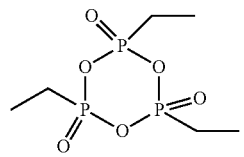

compound 2-2

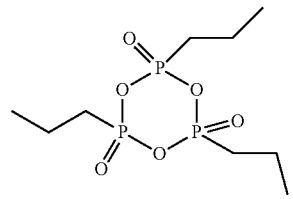

compound 2-3

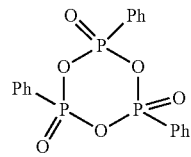

compound 2-4 where -Ph represents phenyl.

The second additive can undergo a complex exchange reaction with main components in the SEI film formed on the interface of the negative electrode plate, which helps form a more stable SEI film of the interface of the negative electrode plate and significantly reduces impedance on the interface of the negative electrode plate, allowing for good power performance of the lithium-ion battery.

After the first additive and the second additive are used in combination, the first additive can form a film on the interface between the positive and negative electrodes to prevent the electrolyte from being oxidized and decomposed, effectively inhibit gas generation in the lithium-ion battery, and further prevent the second additive from being oxidized and decomposed at a high temperature. The second additive preferentially reduces to form a film on the negative electrode, which can overcome the disadvantage of a high impedance in the case of the first additive forming a film on the interface of the negative electrode plate, effectively reduce the DCR growth during the use of the lithium-ion battery, and improve power performance of the lithium-ion battery. Therefore, with the synergistic effect of the two additives, the lithium-ion battery can have a good high-temperature cycling performance, a good high-temperature storage performance, a low direct current resistance, as well as good high-voltage characteristics.

Further, the inventor found that when a percentage of the first additive in the electrolyte was 0.1 wt % to 3 wt %, which was moderate, the formed cathode passivation film could prevent the electrolyte from further reaction, and lithium ions could migrate with small resistance, which significantly improved performance of the battery and was especially beneficial to improve rate charging performance of the lithium-ion battery. Therefore, in an embodiment of this application, a concentration of the first additive in the electrolyte is 0.1 wt % to 3 wt %, and optionally, 1 wt % to 1.5 wt %. For example, the concentration of the first additive in the electrolyte may be 0.1 wt %, 0.2 wt %, 0.5 wt %, 1 wt %, 1.5 wt %, 2 wt %, 2.5 wt %, or 3 wt %, including any value and all ranges and subranges therein, for example, 0.5 wt % to 3 wt %, 0.5 wt % to 2 wt %, 1 wt % to 1.5 wt %, 1 wt % to 2 wt %, or the like.

Further, the inventor found that when a percentage of the second additive in the electrolyte is in the range of 0.05 wt % to 2 wt %, the second additive was sufficient to absorb hydrogen ions generated by the first additive, and inhibit the amount of generated hydrogen ions; and a good SEI film could be formed on the surface of the negative electrode plate, controlling interface impedance of the negative electrode, and optimizing performance of the lithium-ion battery. Therefore, in an embodiment of this application, a concentration of the second additive in the electrolyte is 0.05 wt % to 2 wt %, and optionally, 0.5 wt % to 1.5 wt %. For example, the concentration of the second additive in the electrolyte may be 0.05 wt %, 0.1 wt %, 0.2 wt %, 0.5 wt %, 1 wt %, 1.5 wt %, or 2 wt %, including any value and all ranges and subranges therein, for example, 0.05 wt % to 2 wt %, 0.5 wt % to 1.5 wt %, 0.5 wt % to 2 wt %, 1 wt % to 1.5 wt %, 1 wt % to 2 wt %, or the like.

The type of the organic solvent used in this application is not specifically limited, and can be appropriately selected according to actual needs provided that the technical solution of this application can be implemented. As an example, in an embodiment of this application, the organic solvent is selected from one or more of ethylene carbonate, propylene carbonate, butylene carbonate, fluoroethylene carbonate, ethyl methyl carbonate, dimethyl carbonate, diethyl carbonate, dipropyl carbonate, methyl propyl carbonate, ethylene propyl carbonate, 1,4-butyrolactone, methyl propionate, methyl butyrate, ethyl acetate, ethyl propionate, and ethyl butyrate.

In another embodiment of this application, the organic solvent may be selected from one or more of methyl acrylate, dimethyl sulfite, diethyl sulfite, acid anhydride, N-methylpyrrolidone, N-methylformamide, N-methylacetamide, acetonitrile, N,N-dimethylformamide, dimethyl sulfoxide, dimethyl sulfide, and tetrahydrofuran.

When the organic solvent is a mixture of two or more solvents, their ratio is not particularly limited, and can be appropriately selected according to actual needs provided that the technical solution of this application can be implemented. For example, in an embodiment of this application, when the organic solvent includes two different organic solvents, they can be mixed at a mass ratio of 1:1, 2:8, 3:7, 4:6, 8:2, 7:3, 6:4, or the like.

A percentage of the organic solvent in the electrolyte is not specifically limited, and can be appropriately selected according to actual needs provided that the technical solution of this application can be implemented. As an example, in an embodiment of this application, the percentage of the organic solvent in the electrolyte is 65 wt % to 85 wt %, and optionally, 70 wt % to 80 wt %. For example, the percentage of the organic solvent in the electrolyte may be 65 wt %, 70 wt %, 75 wt %, 80 wt %, or 85 wt %, including any value and all ranges and subranges therein.

Similarly, an electrolytic lithium salt used this application is not specifically limited, and can be appropriately selected according to actual needs provided that the technical solution of this application can be implemented. In an embodiment of this application, the electrolytic lithium salt may be selected from complex lithium salts of Lewis acid and LiF, for example, selected from one or more of $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_9)$, optionally, $LiPF_6$, $LiBF_4$, and $LiAsF_6$, and more optionally, $LiPF_6$ and $LiBF_4$.

In an embodiment of this application, the electrolytic lithium salt may also be selected from imine or methylated lithium salt, for example, selected from one or more of $LiN(SO_2F)_2$, $LiN(SO_2CF_3)_2$, $LiN(SO_2C_2F_5)_2$, $(CF_2)_2(SO_2)_2NLi$ (cyclic), $(CF_2)_3(SO_2)_2NLi$ (cyclic), and $LiC(SO_2CF_3)_3$, optionally, $LiN(SO_2F)_2$, $LiN(SO_2CF_3)_2$, and/or $LiN(SO_2C_2F_5)_2$, and more optionally, $LiN(SO_2F)_2$ and/or $LiN(SO_2CF_3)_2$.

In an embodiment of this application, the electrolytic lithium salt may also be selected from lithium salts containing an $S(=O)_2O$ structure, for example, selected from one or more of $LiSO_3F$, $LiCF_3SO_3$, $CH_3SO_4Li$, $C_2H_5SO_4Li$, $C_3H_7SO_4Li$, lithium trifluoro ((methanesulfonyl) oxy) borate (LiTFMSB), and lithium pentafluoro ((methanesulfonyl) oxy) phosphate (LiPFMSP), and optionally, $LiSO_3F$, $CH_3SO_4Li$, $C_2H_5SO_4Li$, and/or LiTFMSB.

In an embodiment of this application, the electrolytic lithium salt may also be selected from lithium salts containing a $P=O$ or $Cl=O$ structure, for example, selected from one or more of $LiPO_2F_2$, $Li_2PO_3F$, and $LiClO_4$, and optionally, $LiPO_2F_2$ and/or $Li_2PO_3F$.

In an embodiment of this application, the electrolytic lithium salt may also be selected from lithium salts using oxalate ligands as anions, for example, selected from one or more of lithium bis [oxalate-O, O'] borate (LiBOB), lithium difluoro [oxalate-O,O'] borate, lithium difluorobis [oxalate-O, O'] phosphate (LiPFO), and lithium tetrafluoro [oxalate-O, O'] phosphate, and optionally, LiBOB and/or LiPFO.

In an embodiment of this application, the electrolytic lithium salt may also be selected from one or more of $LiPF_6$, $LiPO_2F_2$, $Li_2PO_3F$, $LiBF_4$, $LiSO_3F$, LiTFMSB, $LiN(SO_2F)_2$, $LiN(SO_2CF_3)_2$, $LiN(SO_2C_2F_5)_2$, LiBOB, LiPFO, and lithium tetrafluoro [oxalate-O,O'] phosphate, optionally, selected from one or more of $LiPF_6$, $LiBF_4$, $LiSO_3F$, LiTFMSB, $LiPO_2F_2$, $LiN(SO_2CF_3)_2$, $LiN(SO_2F)_2$, LiBOB, and LiPFO, and more optionally, $LiPF_6$.

A concentration of the electrolytic lithium salt in the electrolyte is not specifically limited, and can be appropriately selected according to actual needs provided that the technical solution of this application can be implemented. In an embodiment of this application, the concentration of the electrolytic lithium salt in the electrolyte is 0.5 M to 2 M (M=mol·L$^{-1}$), and optionally, 0.8 M to 1.2 M. For example, the concentration of the electrolytic lithium salt in the electrolyte is 0.5 M, 0.8 M, 1.0 M, 1.2 M, 1.5 M, or 2.0 M, including any value and all ranges and subranges therein, for example, 0.5 M to 2 M, 0.5 M to 1.5 M, 0.8 M to 1.2 M, 1.0 M to 2.0 M, 1.0 M to 1.5 M, or the like.

Lithium-Ion Battery

The following describes in detail a lithium-ion battery according to a second aspect of this application.

The lithium-ion battery according to the second aspect of this application includes a positive electrode, a negative electrode, a separator, and the electrolyte according to the first aspect of this application.

Figure 2:
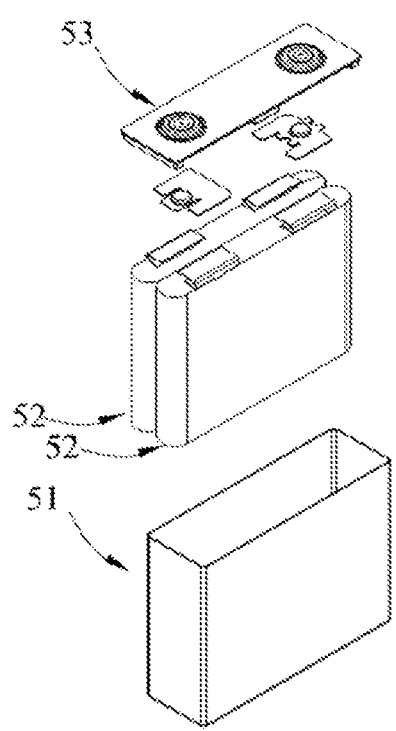
FIG. 2 is an exploded view of the lithium-ion battery in FIG. 1.

FIG. 1 is a three-dimensional diagram of a lithium-ion battery according to an embodiment of this application. FIG. 2 is an exploded view of the lithium-ion battery in FIG. 1. Referring to FIG. 1 and FIG. 2, the lithium-ion battery 5 (hereinafter referred to as a battery cell 5) according to this application includes a housing 51, an electrode assembly 52, a top cover assembly 53, a positive electrode, a negative electrode, a separator, and an electrolyte (not shown). The electrode assembly 52 is accommodated in the housing 51. A quantity of the electrode assemblies 52 is not limited, and may be one or more.

It should be noted that the battery cell 5 in FIG. 1 is a tank type battery, but is not limited thereto in this application. The battery cell 5 may be a bag type battery, which means that the housing 51 is replaced with a metal plastic film and the top cover assembly 53 is eliminated.

The positive electrode is not specifically limited and can be any positive electrode commonly used in lithium-ion batteries. The positive electrode can be appropriately selected according to actual needs provided that the technical solution of this application can be implemented. As an example, in an embodiment of this application, the positive electrode includes a positive electrode active material that can release and accept lithium ions. The positive electrode active material is selected from lithium transition metal composite oxides, including but not limited to lithium cobalt oxides, lithium nickel oxides, lithium manganese oxides, lithium nickel manganese oxides, lithium nickel cobalt manganese oxides, lithium nickel cobalt aluminum oxides, compounds obtained by adding other transition metals or non-transition metals to these lithium transition metal oxides, and a mixture of one or more of such substances.

The negative electrode is not specifically limited and can be any negative electrode commonly used in lithium-ion batteries. The negative electrode can be appropriately selected according to actual needs provided that the technical solution of this application can be implemented. As an example, in an embodiment of this application, the negative electrode includes a negative electrode active material that can accept and release lithium ions. The negative electrode active material is selected from soft carbon, hard carbon, artificial graphite, natural graphite, silicon, a silicon oxide compound, a silicon carbon composite, lithium titanate, a metal that can form an alloy with lithium, and the like.

The material of the separator is not limited and can be selected according to actual needs. In an embodiment of this application, the separator is a polyethylene film (PE) with a thickness of 12 μm.

Generally, in a specific application, the positive electrode needs to be further processed into a positive electrode plate for use. A structure and preparation method of the positive electrode plate are known in the art. For example, the positive electrode active material, a conductive agent, and a binder are uniformly mixed in an organic solvent, and then applied onto a metal (for example, an Al foil), followed by drying and cold pressing to obtain a positive electrode plate.

Similarly, in a specific application, the negative electrode needs to be further processed into a negative electrode plate for use. Structure and preparation method of the negative electrode plate are known in the art. For example, the negative electrode active material, a conductive agent, a binder, and a thickener are uniformly mixed in a solvent, and then applied onto a metal (for example, a Cu foil), followed by drying and cold pressing to obtain a negative electrode plate.

The conductive agent, binder, thickener, solvent, and organic solvent are all conventional reagents used for the lithium-ion battery, and details are not described herein.

After the electrolyte of this application is applied to a lithium-ion battery, the lithium-ion battery can, at high voltage, have a good high-temperature cycling performance and high-temperature storage performance, a low direct current resistance, as well as good high-voltage characteristics. The reasons are as follows: on the one hand, a dioxoboranyl group in a first additive forms a protective film on a surface of the positive electrode plate to stabilize an interface between the electrode and the electrolyte, thereby improving performance of the battery; in addition, an alkenyl structure in the first additive undergoes an electropolymerization reaction on the surface of the positive electrode plate to form a passivation film with good conductivity, inhibiting an oxidative reaction of the electrolyte on the positive electrode and improving rate charging performance of the lithium-ion battery. On the other hand, through secondary injection of the electrolyte, a second additive preferentially forms an SEI film on a surface of the negative electrode plate, and an oxygen atom of the second additive phosphoric acid cyclic anhydride has a stronger electron withdrawing ability, so that hydrogen ions generated during the electropolymerization of the alkenyl structure in the first additive can be electrostatically adsorbed on the oxygen atom of the second additive phosphoric acid cyclic anhydride, thereby preventing the hydrogen ions from continuously reacting with the lithium salt and the SEI film formed on the surface of the negative electrode plate, and improving storage performance and cycling performance of the lithium-ion battery.

Battery Module

The following briefly describes a battery module according to a third aspect of this application.

Figure 3:
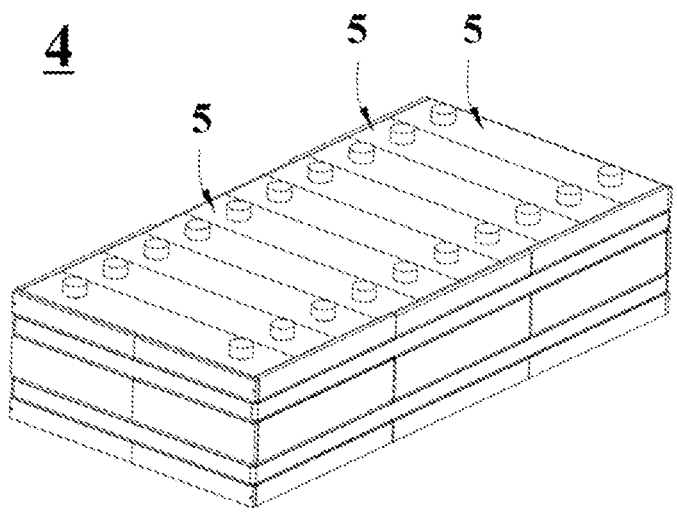
FIG. 3 is a perspective view of a battery module according to an embodiment of this application.

FIG. 3 is a three-dimensional diagram of a battery module according to an embodiment of this application. Referring to FIG. 3, the battery module 4 according to this application includes a plurality of battery cells 5 arranged in a longitudinal direction.

The battery module 4 may be used as a power source or an energy storage apparatus. A quantity of battery cells 5 included in the battery module 4 may be adjusted based on use and capacity of the battery module 4.

Battery Pack

The following briefly describes a battery pack according to a fourth aspect of this application.

Figure 4:
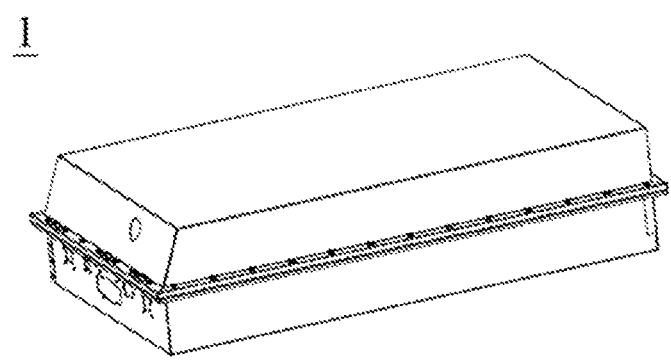
FIG. 4 is a perspective view of a battery pack according to an embodiment of this application.
Figure 5:
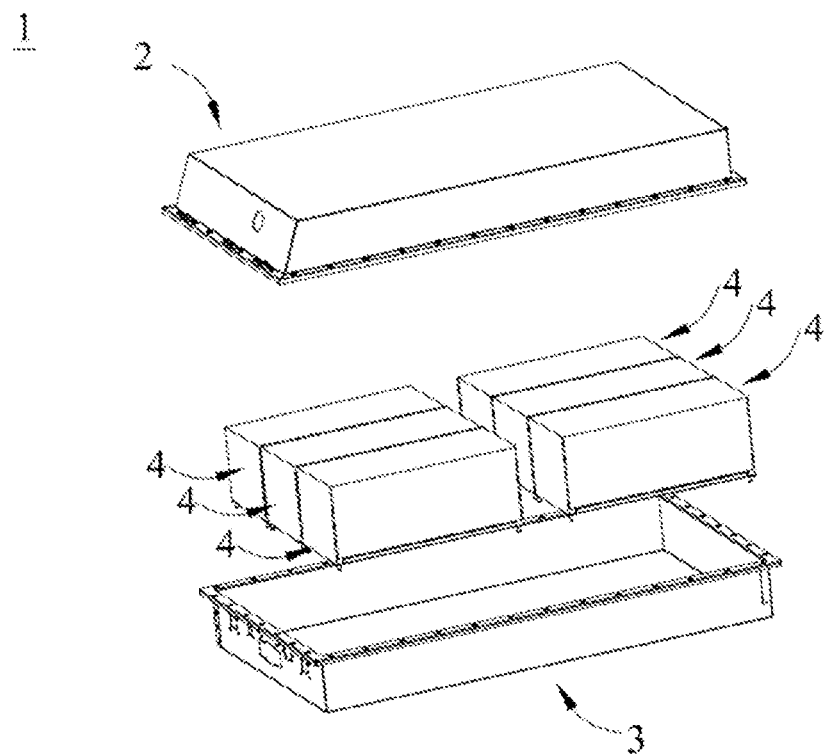
FIG. 5 is an exploded view of the battery pack in FIG. 4.

FIG. 4 is a three-dimensional diagram of a battery pack according to an embodiment of this application. FIG. 5 is an exploded view of the battery pack in FIG. 4. Referring to FIG. 4 and FIG. 5, the battery pack 1 according to this application includes an upper box body 2, a lower box body 3, and the battery module 4. The upper box body 2 and the lower box body 3 are assembled together to form a space for accommodating the battery module 4. The battery module 4 is disposed in the space formed by the upper box body 2 and the lower box body 3 that are assembled together.

An output electrode of the battery module 4 penetrates through one or both of the upper box body 2 and the lower box body 3 to output power to or receive charge from an outer source.

It should be noted that a quantity and an arrangement of the battery modules 4 used in the battery pack 1 may be determined depending on an actual need. The battery pack 1 may be used as a power source or an energy storage apparatus.

Apparatus

The following briefly describes an apparatus according to a fifth aspect of this application.

Figure 6:
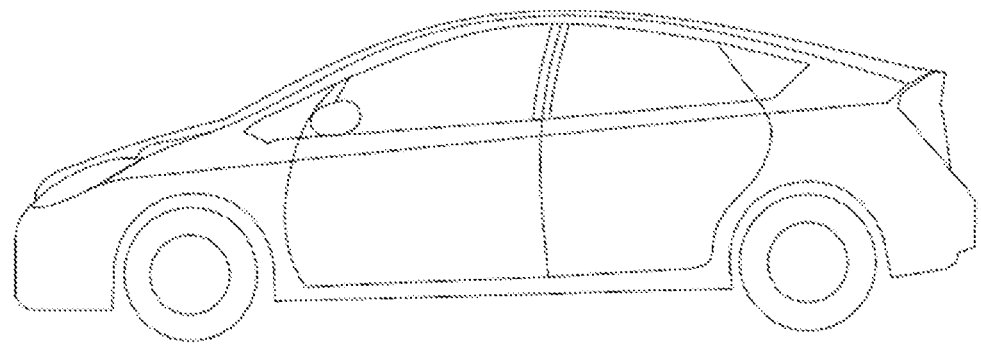
FIG. 6 is a schematic diagram of an apparatus using a lithium-ion battery as a power source according to an embodiment of this application.

FIG. 6 is a schematic diagram of an apparatus using a lithium-ion battery as a power source according to an embodiment of this application. As an example only, in FIG. 6, the apparatus that uses the battery cell 5 is an electric automobile. However, the apparatus that uses the battery cell 5 is obviously not limited to this, but may be any electric vehicle other than electric automobiles (for example, an electric bus, an electric tram, an electric bicycle, an electric motorbike, an electric scooter, an electric golf cart, or an electric truck), an electric vessel, an electric tool, an electronic device, and an energy storage system.

The electric automobile may be a battery electric vehicle, a hybrid electric vehicle, or a plug-in hybrid electric vehicle. Certainly, depending on an actual use form, the apparatus provided in the fifth aspect of this application may include the battery module 4 according to the third aspect of this application. Certainly, the apparatus provided in the fifth aspect of this application may also include the battery pack 1 according to the fourth aspect of this application.

EXAMPLES

This application is further described with reference to specific examples. It should be understood that the following exemplary examples are only used for illustration but do not intend to limit this application. Unless otherwise stated, all reagents used in the examples are commercially available or synthesized in a conventional manner, and can be used directly without further treatment. Experimental conditions not specified in the examples are conventional conditions, or conditions recommended by material suppliers or equipment suppliers.

Examples 1 to 14

In Examples 1 to 14, the preparation in this application was completed according to the following methods.
(1) Preparation of a Positive Electrode Plate and a Negative Electrode Plate:

A positive electrode active material $LiNi_{0.5}Mn_{0.3}Co_{0.2}O_2$, a conductive agent acetylene black, and a binder polyvinylidene fluoride (PVDF) were fully stirred and uniformly mixed in an N-methylpyrrolidone solvent system at a weight ratio of 94:3:3, and then the mixture was applied onto an Al foil, followed by drying and cold pressing to obtain a positive electrode plate.

A negative electrode active material artificial graphite, a conductive agent acetylene black, a binder styrene-butadiene rubber (SBR), and a thickener sodium carboxymethyl cellulose (CMC) were fully stirred and uniformly mixed at a weight ratio of 95:2:2:1 in a deionized water solvent system, and then the mixture was applied onto a Cu foil, followed by drying and cold pressing to obtain a negative electrode plate.
(2) Preparation of an Electrolyte In a glove box filled with argon, ethylene carbonate (EC) and diethyl carbonate (DEC) were mixed at a mass ratio of EC:DEC=20:80 as an organic solvent. Lithium hexafluorophosphate was added to the organic solvent to obtain a lithium salt with a concentration of 1.0 mol/L. A first additive was added to and uniformly mixed with the lithium salt to obtain an electrolyte A. A second additive was added to and uniformly mixed with the lithium salt to obtain an electrolyte B. Specific substances and respective usage amounts of the first additive and second additive are shown in Table 1.
(3) Preparation of a Lithium-Ion Battery A polypropylene film (PE) with a thickness of 12 μm was used as a separator. The prepared positive electrode plate, separator, and negative electrode plate were stacked in order, so that the separator was sandwiched between the positive and negative electrodes for separation. Then the stack was wound to obtain a bare cell. Tabs were welded, and then the bare cell was placed in an outer package. The prepared electrolyte B was injected into the dried bare cell, followed by packaging, standing, charging to 3.3V at a constant current of 0.02 C, charging to 3.6V at a constant current of 0.1 C, and shaping. The electrolyte A was injected into the shaped battery cell, followed by charging to 4.4V at a constant current of 0.33 C, charging to a current of 0.05 C at a constant voltage of 4.4V, discharging to 2.8V at a constant current of 1 C, and capacity testing, to complete the preparation of a lithium-ion battery. The prepared soft-packed lithium-ion battery had a thickness of 4.0 mm, a width of 60 mm, and a length of 140 mm.

Comparative Examples 1 to 13

The preparation method of the lithium-ion batteries of Comparative Examples 1 to 13 not pertaining to this application is basically similar to that of Examples 1 to 14 of this application, except that only the electrolyte B or electrolyte A is added during the preparation of the lithium-ion batteries.
Performance Test
(1) Cycling Performance Test for the Lithium-ion Battery At 45° C., the lithium-ion battery was charged to 4.4V at a constant current of 1 C, then charged to a current of 0.05 C at a constant voltage of 4.4V, and then discharged to 2.8V at a constant current of 1 C. This was one charge-discharge cycle. Then 500 cycles of charge/discharge were tested under the foregoing conditions.

Capacity retention rate (%) of the lithium-ion battery after 500 cycles=(discharge capacity of the $500^{th}$ cycle/discharge capacity of the 1st cycle)×100%.
(2) High-Temperature Storage Volume Swelling Test for the Lithium-ion Battery At 25° C., the lithium-ion battery was left standing for 30 minutes, then charged at a constant current of 1 C to a voltage of 4.4V, and then charged at a constant voltage of 4.4V to a current of 0.05 C. The volume of the lithium-ion battery at that point was tested and recorded as V0. Then the fully charged lithium-ion battery was put into an incubator and stored at 85° C. for 30 days. The volume then was tested by the drainage method and recorded as V1.

Volume swelling ratio (%) of the lithium-ion battery stored at 85° C. for 30 days=(V1−V0)/V0×100%.
(3) High-Temperature Storage Performance Test for the Lithium-Ion Battery At 25° C., the lithium-ion battery was charged at a constant current of 1 C to a voltage of 4.4V, then charged at a constant voltage of 4.4V to a current of 0.05 C, and then discharged at a constant current of 1 C to a voltage of 2.8V. The discharge capacity of the lithium-ion battery at that point was tested and recorded as C0. The lithium-ion battery was charged at a constant current of 1 C to a voltage of 4.4V, and then charged at a constant voltage of 4.4V to a current of 0.05 C. The lithium-ion battery was placed into an incubator, kept at 60° C. for 90 days, and then taken out. The lithium-ion battery was discharged at a constant current of 1 C to a voltage of 2.8V, and the discharge capacity of the lithium-ion battery at that point was tested and recorded as C1.

Capacity retention rate (%) of the lithium-ion battery stored at 60° C. for 90 days=(C1)/C0×100%.
(4) Direct Current Resistance (DCR) Test for the lithium-ion battery at Room Temperature At 25° C., the state of charge (SOC) of the lithium-ion battery was adjusted to 50% of the full charge capacity. The lithium-ion battery was left standing for 2 hours, and the voltage at that point was tested and recorded as U1. Then the lithium-ion battery was discharged at a rate of 0.3 C for 10 s, and the voltage at that point was tested and recorded as U2.

DCR of the lithium-ion battery at 25° C.=(U1−U2)/I, where I represents current.

Table 1 shows performance test results of the lithium-ion batteries in Examples 1 to 14 of this application and Comparative Example 1 to 13.

TABLE 1

| | Additive and concentration (wt %) | | Electrical property | | | |
|---|---|---|---|---|---|---|
| | First additive and concentration | Second additive and concentration | Capacity retention rate after 500 cycles at 45° C. | Volume swelling ratio after storage at 85° C. for 30 days | Capacity retention rate after storage at 60° C. for 90 days | DCR/m Ω at 25° C. |
| Example 1 | 0.5% Compound 1-1 | 0.5% Compound 2-1 | 85.8% | 12.9% | 87.9% | 100.2 |
| Example 2 | 1% Compound 1-1 | 0.5% Compound 2-1 | 88.2% | 10.2% | 90.3% | 89.0 |
| Example 3 | 3% Compound 1-1 | 0.5% Compound 2-1 | 90.4% | 8.7% | 91.3% | 159.2 |
| Example 4 | 1% Compound 1-1 | 0.05% Compound 2-1 | 88.4% | 10.3% | 90.2% | 97.3 |
| Example 5 | 1% Compound 1-1 | 1% Compound 2-1 | 89.2% | 10.0% | 89.9% | 92.3 |
| Example 6 | 1% Compound 1-1 | 2% Compound 2-1 | 87.8% | 11.2% | 88.6% | 88.8 |
| Example 7 | 1% Compound 1-1 | 0.5% Compound 2-2 | 89.2% | 10.9% | 89.2% | 96.3 |
| Example 8 | 1% Compound 1-1 | 0.5% Compound 2-3 | 87.9% | 11.4% | 89.1% | 99.4 |
| Example 9 | 1% Compound 1-1 | 0.5% Compound 2-4 | 87.7% | 11.5% | 88.4% | 100.2 |
| Example 10 | 1% Compound 1-2 | 0.5% Compound 2-1 | 88.3% | 11.4% | 87.9% | 100.2 |
| Example 11 | 1% Compound 1-3 | 0.5% Compound 2-1 | 87.9% | 11.5% | 88.0% | 102.5 |
| Example 12 | 1% Compound 1-4 | 0.5% Compound 2-1 | 88.1% | 11.5% | 87.6% | 100.9 |
| Example 13 | 1% Compound 1-5 | 0.5% Compound 2-1 | 88.2% | 11.7% | 87.8% | 101.3 |
| Example 14 | 1% Compound 1-6 | 0.5% Compound 2-1 | 87.7% | 11.8% | 87.3% | 103.6 |
| Comparative Example 1 | \ | \ | 72.4% | 57.1% | 79.8% | 64.2 |
| Comparative Example 2 | 1% Compound 1-1 | \ | 87.4% | 10.6% | 89.2% | 134.4 |
| Comparative Example 3 | 1% Compound 1-2 | \ | 86.4% | 11.5% | 88.7% | 137.9 |
| Comparative Example 4 | 1% Compound 1-3 | \ | 86.1% | 12.5% | 88.0% | 140.0 |
| Comparative Example 5 | 1% Compound 1-4 | \ | 86.0% | 12.4% | 88.1% | 145.2 |
| Comparative Example 6 | 1% Compound 1-5 | \ | 86.1% | 12.3% | 88.2% | 145.3 |
| Comparative Example 7 | 1% Compound 1-6 | \ | 85.9% | 12.0% | 87.5% | 144.7 |

TABLE 1-continued

| | Additive and concentration (wt %) | | Electrical property | | | |
|---|---|---|---|---|---|---|
| | | | Capacity retention | Volume swelling ratio after | Capacity retention rate after | |
| | First additive and concentration | Second additive and concentration | rate after 500 cycles at 45° C. | storage at 85° C. for 30 days | storage at 60° C. for 90 days | DCR/m Ω at 25° C. |
| Comparative Example 8 | \ | 0.5% Compound 2-1 | 69.5% | 56.5% | 78.1% | 120.3 |
| Comparative Example 9 | \ | 0.5% Compound 2-2 | 67.4% | 57.6% | 77.7% | 123.4 |
| Comparative Example 10 | \ | 0.5% Compound 2-3 | 67.2% | 57.3% | 77.1% | 125.4 |
| Comparative Example 11 | \ | 0.5% Compound 2-4 | 67.0% | 56.8% | 76.3% | 127.5 |
| Comparative Example 12 | 3% Compound 1-1 | \ | 90.2% | 8.8% | 91.2% | 170.2 |
| Comparative Example 13 | \ | 3% Compound 2-1 | 64.3% | 58.8% | 73.4% | 145.7 |

It can be seen from the test results of Comparative Examples 2 to 7 and Comparative Example 12 that the high-temperature cycling capacity retention rate, high-temperature storage volume swelling ratio, high-temperature storage capacity, and power performance of the lithium-ion battery were poor when only the first additive was added to the electrolyte. The reason was that the first additive generated hydrogen ions during electropolymerization, and the hydrogen ions continuously reacted with LiFP$_6$ and the SEI film formed on the surface of the negative electrode plate, affecting the electrical performance.

It can be seen from the test results of Comparative Example 1, Comparative Examples 8 to 11, and Comparative Example 13 that the high-temperature cycling capacity retention rate, high-temperature storage volume swelling ratio, high-temperature storage capacity, and power performance of the lithium-ion battery were still poor when only the second additive was added to the electrolyte. The reason was that no positive electrode film-forming additive was available to protect the positive electrode, leaving the non-aqueous electrolyte prone to reacting with the positive electrode, thereby deteriorating performance of the lithium-ion battery.

It can be seen from the test results of Examples 1 to 14 that adding both the first additive and the second additive to the electrolyte allowed the lithium-ion battery to have a higher high-temperature cycling capacity retention rate, a higher high-temperature storage capacity retention rate, a lower high-temperature storage volume swelling ratio, as well as a lower direct current resistance at room temperature. To be specific, when the first additive is used together with the second additive, the first additive alkenyl dioxaborolane compound could improve high-temperature performance of the lithium-ion battery while preventing the alkenyl dioxaborolane compound from damaging the SEI film.

It can be seen from Examples 1 to 3 and Comparative Example 1 that as the percentage of the first additive increased, the high-temperature performance continued to improve, but the low-temperature impedance first decreased and then increased. The possible reason was that an excessively high percentage of the first additive led to an excessively thick passivation layer after complexation of the positive electrode, affecting transmission of lithium ions on the surface of the positive electrode plate, manifested by the high direct current resistance at room temperature.

It can be seen from Examples 4 to 6, Comparative Example 1, and Comparative Example 2 that as the percentage of the second additive increased, the low-temperature direct current resistance gradually decreased, but when the percentage of the second additive was higher, the high-temperature cycle capacity retention rate and high-temperature storage capacity retention rate deteriorated.

According to the disclosure and teaching of this specification, those skilled in the art may further make changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. An electrolyte for lithium-ion battery, comprising:
   an organic solvent;
   an electrolytic lithium salt dissolved in the organic solvent; and
   additives;
   wherein the additives comprise a first additive and a second additive;
   wherein the first additive comprises an alkenyl dioxaborolane compound represented by formula I or formula II:

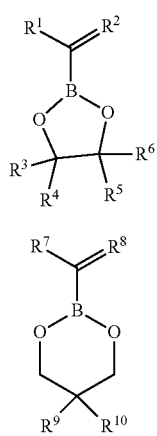

formula I formula II wherein $R^3$, $R^4$, $R^5$, $R^6$, $R^9$, and $R^{10}$ are each independently selected from H and a saturated alkyl group containing 1 to 10 carbon atoms, $R^1$ and $R^2$ jointly form a structure, $R^7$ and $R^8$ jointly form a structure, wherein the structure is selected from the group consisting of:

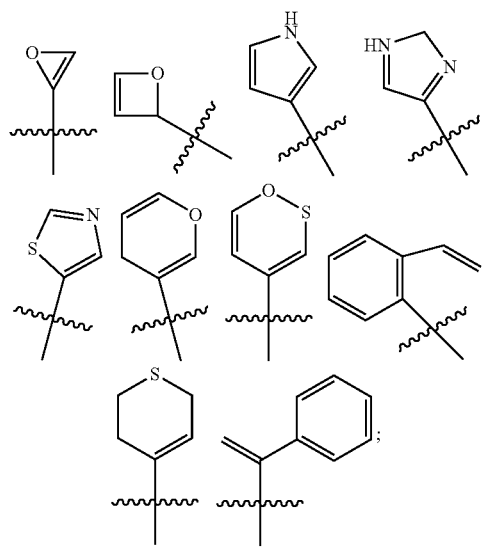

and
the second additive comprises phosphoric acid cyclic anhydride represented by formula III, Formula III

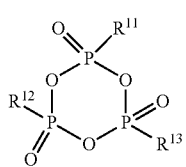

wherein $R^{11}$, $R^{12}$, and $R^{13}$ are each independently selected from H, a saturated or unsaturated alkyl group containing 1 to 20 carbon atoms, or a group containing 6 to 18 carbon atoms and at least one benzene ring.

2. The electrolyte according to claim 1, wherein the structure is selected from the group consisting of:

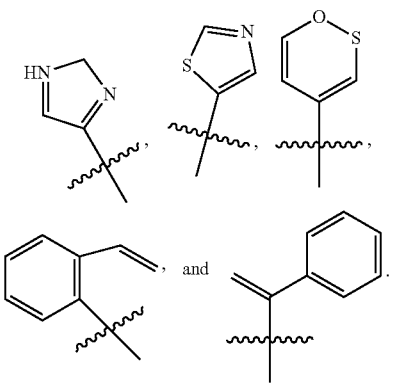

3. The electrolyte according to claim 1, wherein the first additive is selected from one or more of the following compounds:
compound 1-5:2-(3,6-dihydro-2H-thiopyran-4-yl)-4,4,5,5-tetramethyl-1,3,2-dioxaborolane, and
compound 1-6:2-(1-styryl)-4,4,5,5-tetramethyl-(1,3,2)dioxaborolane.

4. The electrolyte according to claim 1, wherein in formula III, $R^{11}$, $R^{12}$, and $R^{13}$ are each independently selected from H or a saturated or unsaturated alkyl group containing 1 to 5 carbon atoms.

5. The electrolyte according to claim 1, wherein the second additive is selected from one or more of the following compounds:
compound 2-1: trimethyl phosphoric acid cyclic anhydride,
compound 2-2: triethyl phosphoric acid cyclic anhydride,
compound 2-3: tripropyl phosphoric acid cyclic anhydride, and
compound 2-4: triphenyl phosphoric acid cyclic anhydride.

6. The electrolyte according to claim 1, wherein a concentration of the first additive in the electrolyte is 0.1 wt % to 3 wt %.

7. The electrolyte according to claim 1, wherein a concentration of the second additive in the electrolyte is 0.05 wt % to 2 wt %.

8. The electrolyte according to claim 1, wherein the electrolytic lithium salt is selected from one or more of $LiPF_6$, $LiPO_2F_2$, $Li_2PO_3F$, $LiBF_4$, $LiSO_3F$, LiTFMSB, $LiN(SO_2F)_2$, $LiN(SO_2CF_3)_2$, $LiN(SO_2C_2F_5)_2$, LiBOB, LiPFO, and lithium tetrafluoro [oxalate-O,O'] phosphate.

9. The electrolyte according to claim 1, wherein the electrolytic lithium salt is selected from one or more of $LiPF_6$, $LiBF_4$, $LiSO_3F$, LiTFMSB, $LiPO_2F_2$, $LiN(SO_2CF_3)_2$, $LiN(SO_2F)_2$, LiBOB, and LiPFO.

10. The electrolyte according to claim 1, wherein a concentration of the electrolytic lithium salt in the electrolyte is 0.5 M to 2 M.

11. A lithium-ion battery, comprising a positive electrode, a negative electrode, a separator, and the electrolyte according to claim 1.

12. An apparatus, comprising the lithium-ion battery according to claim 11, wherein the lithium-ion battery is used as a power source for the apparatus, and the apparatus comprises an electric vehicle, a hybrid electric vehicle, a plug-in hybrid electric vehicle, an electric bicycle, an electric scooter, an electric golf cart, an electric truck, an electric vessel, and an energy storage system.

13. A battery module, comprising the lithium-ion battery according to claim 11.

14. A battery pack, comprising the battery module according to claim 13.

15. The electrolyte according to claim 1, wherein the first additive comprises:
compound 1-5:2-(3,6-dihydro-2H-thiopyran-4-yl)-4,4,5,5-tetramethyl-1,3,2-dioxaborolane.

16. The electrolyte according to claim 1, wherein the first additive comprises:
compound 1-6:2-(1-styryl)-4,4,5,5-tetramethyl-(1,3,2)dioxaborolane.

17. The electrolyte according to claim 1, wherein the second additive comprises:
compound 2-4: triphenyl phosphoric acid cyclic anhydride.

18. An electrolyte for lithium-ion battery, comprising:
an organic solvent;
an electrolytic lithium salt dissolved in the organic solvent; and
additives;
wherein the additives comprise a first additive and a second additive;
wherein the first additive comprises an alkenyl dioxaborolane compound selected from the group consisting of:
compound 1-1:2-isopropenyl-4,4,5,5-tetramethyl-1,3,2-dioxaborolane,
compound 1-2:5,5-dimethyl-2-(isopropen-1-yl)-1,3,2-dioxaborolane,
compound 1-4: trans-2-butene-2-boronic acid pinacol ester,
compound 1-5:2-(3,6-dihydro-2H-thiopyran-4-yl)-4,4,5,5-tetramethyl-1,3,2-dioxaborolane,
compound 1-6:2-(1-styryl)-4,4,5,5-tetramethyl-(1,3,2)-dioxaborolane, and
any combinations thereof, and
the second additive comprises phosphoric acid cyclic anhydride selected from the group consisting of:
compound 2-1: trimethyl phosphoric acid cyclic anhydride,
compound 2-2: triethyl phosphoric acid cyclic anhydride,
compound 2-3: tripropyl phosphoric acid cyclic anhydride,
compound 2-4: triphenyl phosphoric acid cyclic anhydride, and
any combinations thereof.

19. The electrolyte according to claim 18, wherein the first additive comprises one selected from the group consisting of:
compound 1-5:2-(3,6-dihydro-2H-thiopyran-4-yl)-4,4,5,5-tetramethyl-1,3,2-dioxaborolane,
compound 1-6:2-(1-styryl)-4,4,5,5-tetramethyl-(1,3,2)-dioxaborolane, and
any combinations thereof.

* * * * *